Hoke & Brown,
Hay Press,
No. 69,807.    Patented Oct. 15, 1867.
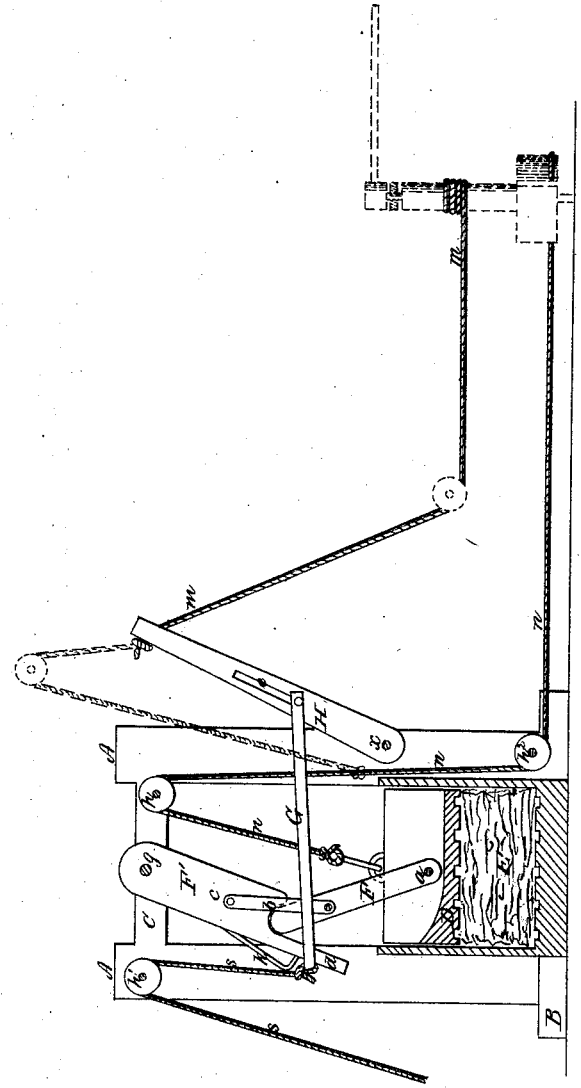
Witnesses
J. A. Service
Wm Trevurn
Inventors
G. H. Hoke
J. A. Brown
Per Munn & Co
Attorneys

United States Patent Office.

GEORGE H. HOKE AND JOHN A. BROWN, OF ELIZABETH, INDIANA.

Letters Patent No. 69,807, dated October 15, 1867.

---

IMPROVED BALING-PRESS.

---

The Schedule referred to in these Letters Patent and making part of the same.

---

TO ALL WHOM IT MAY CONCERN:

Be it known that we, GEORGE H. HOKE and JOHN A. BROWN, of Elizabeth, in the county of Harrison, and State of Indiana, have invented a new and useful improvement in Baling-Press; and we do hereby declare that the following is a full, clear, and exact description thereof, which will enable others skilled in the art to make and use the same, reference being had to the accompanying drawings, forming part of this specification, in which—

The drawing represents a vertical longitudinal section of our improved baling-press, showing all the working parts connected for operation.

This invention relates to an improved baling-press for hay, cotton, or other substances, and consists in improvements in the construction, by an arrangement of a lever and toggle connected with a beater or follower, operated directly, by means of rope and capstan, with horse-power, as hereinafter more particularly described.

This press is permanently erected in a barn or storehouse, with the upper end of the frame above the second floor, with the arrangements for working with horse-power on the ground floor.

The frame is made of four strong upright timbers, A A, about twenty-seven feet long, which are set in long heavy sills B B running lengthwise of the press and united by bolts. The tops of the side timbers are secured together by cross-ties C. The lower end of the frame is boxed in as usual, to contain a bale of proper size, and is provided with side doors or flaps, attached in any suitable manner, for supporting the pressure of the bale when it is pressed, and opening readily to release it.

The beater or follower D, fitted in the bale-chest or box E, is made of heavy timbers bolted together, with a deep longitudinal recess or mortise on the upper side, in which is pivoted the lower end of the lower arm F of the toggle. The pivot $a$ of the arm moves in a vertical slot in the sides of the recess, to allow the beater D to rise and fall and touch the bottom of the baling-box, for the purpose of beating or packing the hay in thin layers when forming the bale at the beginning.

The lower arm F of the toggle is connected with the upper arm F' by a strong iron strap or stirrup, $b$, the upper end of which is allowed a little play in a slot, $c$. The ends of the arms F F' are strapped or plated with iron, to form the face of the toggle-joint, the concave side of which is made in the upper arm F', one side of which has a prong, $d$, projecting down beside the upper end of the lower arm F, around which prong $d$ passes one end of a heavy iron stirrup, G, the other end of which works in a long slot, $e$, in the long operating lever H. The lever H is pivoted by a strong three-inch bolt, $x$, to the frame timbers A A. The upper end of the arm F' is pivoted to the cross-ties C at $g$, and on each side of the arm are sheaves $h\ h'$, hung across the frame. On the track of the projecting prong $d$ of the upper arm F' is an iron guard, $k$, that catches the stirrup G and prevents its rising.

For operating the press, a strong rope, $m$, is fastened to the end of the long lever H, which passes down under a sheave to a capstan, as shown in the drawing. The capstan draws the lever down to compress the bale, after it has been packed by beating, by means of the stirrup G bearing on the prong $d$ of the upper toggle-arm F', as will be readily understood. For raising the lever another hand-rope is attached to the end, and passes over a sheave above the press, as shown in red on the drawing, also passing down and connecting with the rope $n$, which is attached to the beater D, and runs over the sheave $h$ down to another sheave, $h^2$, at the bottom of the frame, and thence to a drum on the capstan-shaft, as shown in red in the drawing, the whole of which is so arranged that when the lever H is drawn down, to operate the toggle and compress the hay with the follower, the rope $n$ unwinds from the drum, and vice versa. A cord, $s$, is attached to the end of the stirrup G, and passes over the sheave $h'$, by which the stirrup is drawn up by hand out of the way, when the hay or cotton is introduced into the press.

After the hay has been well packed in the baling-chest, by repeated beating with the follower, sixteen times being quite enough for the purpose, the long lever is brought down to operate the toggle and finish the work of compression.

Having thus described our invention, we claim as new, and desire to secure by Letters Patent—

The combination and arrangement of the toggle-joint with arms F F', connected by the strap $b$, the beater D, the stirrup G, and the lever H, constructed and operating substantially as and for the purpose herein described.

GEORGE H. HOKE,
JOHN A. BROWN.

Witnesses:
JOHN ZIMMERMAN,
JOHN E. WILLIAR.